United States Patent
Liu

(10) Patent No.: US 10,491,657 B2
(45) Date of Patent: Nov. 26, 2019

(54) NETWORK ACCELERATION METHOD, APPARATUS AND DEVICE BASED ON ROUTER DEVICE

(71) Applicant: Tencent Technology (Shenzhen) Company Limited, Shenzhen, Guangdong (CN)

(72) Inventor: Gang Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 485 days.

(21) Appl. No.: 15/229,983

(22) Filed: Aug. 5, 2016

(65) Prior Publication Data

US 2016/0344796 A1    Nov. 24, 2016

Related U.S. Application Data

(63) Continuation of application No. PCT/CN2015/072653, filed on Feb. 10, 2015.

(30) Foreign Application Priority Data

Feb. 10, 2014  (CN) .......................... 2014 1 0046974

(51) Int. Cl.
  *H04L 29/08*   (2006.01)
(52) U.S. Cl.
  CPC .......... *H04L 67/06* (2013.01); *H04L 67/2842* (2013.01); *H04L 67/2847* (2013.01); *H04L 29/08* (2013.01)
(58) Field of Classification Search
  None
  See application file for complete search history.

(56) References Cited

U.S. PATENT DOCUMENTS

| 2006/0129636 A1* | 6/2006 | Matsuura | ........... G01C 21/3682 |
| | | | 709/203 |
| 2011/0208808 A1* | 8/2011 | Corbett | ............. G06F 17/30442 |
| | | | 709/203 |

(Continued)

FOREIGN PATENT DOCUMENTS

| CN | 1885823 A | 12/2006 |
| CN | 1937503 A | 3/2007 |

(Continued)

OTHER PUBLICATIONS

International Search Report and Written Opinion received in PCT Application No. PCT/CN2015/072653 dated May 13, 2015.

(Continued)

*Primary Examiner* — James A Edwards
(74) *Attorney, Agent, or Firm* — Brinks Gilson & Lione

(57) ABSTRACT

A network acceleration method, apparatus and device based on a router device are provided. The method includes: receiving a data access request sent by a user terminal and obtaining a download link included in the data access request; determining whether a download file corresponding to the download link is pre-cached; and if the download file corresponding to the download link is pre-cached, sending the corresponding download file to the user terminal. A router determines whether the file corresponding to the link in the data access request is a download file pre-cached by the router, and if the file corresponding to the link in the data access request is the pre-cached download file, the cache file in the router is directly sent to the user terminal for downloading.

12 Claims, 4 Drawing Sheets

(56) References Cited

U.S. PATENT DOCUMENTS

| | | | |
|---|---|---|---|
| 2012/0149346 A1 | 6/2012 | Akhtar et al. | |
| 2012/0166618 A1* | 6/2012 | Dahod | H04L 12/66 709/224 |
| 2012/0167075 A1 | 6/2012 | Tepper et al. | |
| 2013/0132498 A1* | 5/2013 | Wainner | H04L 67/2847 709/208 |
| 2015/0304412 A1 | 10/2015 | Xiong et al. | |
| 2016/0164997 A1* | 6/2016 | Karasaridis | H04L 67/2847 709/213 |

FOREIGN PATENT DOCUMENTS

| | | |
|---|---|---|
| CN | 101977228 A | 2/2011 |
| CN | 102238137 A | 11/2011 |
| CN | 102591682 A | 7/2012 |
| CN | 102655512 A | 9/2012 |
| CN | 102970369 A | 3/2013 |
| CN | 103430169 A | 12/2013 |
| WO | WO 2004/088953 A1 | 10/2004 |
| WO | WO 2015/117570 A1 | 8/2015 |

OTHER PUBLICATIONS

Office Action and Summary to corresponding Chinese Application No. 201410046974.3, dated Apr. 13, 2018, pp. 1-7.
Office Action and Summary to corresponding Chinese Application No. 201410046974.3, dated Sep. 27, 2018, pp. 1-16.

* cited by examiner

NETWORK ACCELERATION METHOD, APPARATUS AND DEVICE BASED ON ROUTER DEVICE

CROSS-REFERENCE TO RELATED APPLICATIONS

This application is a continuation of International Application No. PCT/CN2015/072653, filed on Feb. 10, 2015, which claims priority to Chinese Patent Application No. 201410046974.3, filed on Feb. 10, 2014, both of which are hereby incorporated by reference in their entireties.

FIELD OF THE TECHNOLOGY

The present disclosure belongs to the field of communications, and in particular, to a network acceleration method, apparatus and device based on a router device.

BACKGROUND OF THE DISCLOSURE

With the development of communications technologies, a growing number of terminal devices, which include such as smartphones, PADs, or notebook computers, connect to a network. Moreover, with continuous improvement of a processing speed of a terminal processor, games or other application programs having an increasing amount of data also need to be downloaded to a terminal directly by means of a network. On the basis of a conventional network, new requirements are raised for a download speed and stability of the network.

As a necessary device for connecting different networks, a router is widely applied to networks of small and medium-sized enterprises and family networks, and especially, a wireless router can enable a mobile terminal of a user, such as a smartphone or a PAD, connect to a network conveniently by means of WiFi. High-performance mobile terminal configuration and a stable and reliable wireless network environment enable increasingly more users to use an increasingly large-scale data interaction application, such as an online game, by means of the mobile terminal.

However, along with increase of the number of users and increasingly higher requirements of the users for download, the conventional network generally cannot meet the requirements of the users. In order to obtain a faster download speed and better network stability, the users can only further upgrade hardware of the router in a way of such as changing dual band, increasing channel support from original 2.4G to 5G, or enhancing a signal of the router by using a multistage antenna, or in a way of further increasing a network bandwidth, which, however, needs to change hardware configuration or occupy a wider bandwidth, which has large hardware costs and low utilization of network bandwidth resources.

SUMMARY

An objective of embodiments of the present disclosure is to provide a network acceleration method, apparatus and device based on a router device, so as to solve problems in the prior art of large hardware costs and low utilization of network bandwidth resources caused due to the intention of obtaining a faster download speed.

The embodiments of the present disclosure are implemented by a network acceleration method based on a router device, including:

receiving a data access request sent by a user terminal and obtaining a download link included in the data access request;

determining whether a download file corresponding to the download link is pre-cached; and if the download file corresponding to the download link is pre-cached, sending the corresponding download file to the user terminal.

Another objective of the embodiments of the present disclosure is to provide a network acceleration apparatus based on a router device, including:

a receiving and obtaining unit, configured to receive a data access request sent by a user terminal and obtain a download link included in the data access request;

a first determining unit, configured to determine whether a download file corresponding to the download link is pre-cached; and a sending unit, configured to: if the download file corresponding to the download link is pre-cached, send the corresponding download file to the user terminal.

Another objective of the embodiments of the present disclosure is to provide a network node device, including a controller, a memory and a data transceiver, the data transceiver being configured to receive a data access request of a user terminal, the controller obtaining a download link included in the data access request and determining whether a download file corresponding to the download link is pre-cached in the memory, and if the download file corresponding to the download link is pre-cached in the memory, the data transceiver sending the corresponding download file to the user terminal.

DESCRIPTION OF EMBODIMENTS

In order to make the objectives, technical solutions and advantages of the present disclosure more comprehensible, the present disclosure is described in the following in further detail with reference to the accompanying drawings and embodiments. It should be understood that, specific embodiments described herein are only intended to explain the present disclosure, but not intended to limit the present disclosure.

At present, most common problems of network access are network delay and network speed, and main reasons are interworking of multiple operators, access of small operators, and the bandwidth occupied by downloading a traffic intensive application such as video, and so on. The interworking of multiple operators refers to, for example, data exchange between China Telecom and China Netcom; software application and video application downloading needs to occupy a large quantity of network bandwidths, and network congestion is easily caused during a peak period; even though a data transfer service CDN node is deployed, a large quantity of CDN bandwidths need to be consumed, and the speed still cannot be fully ensured.

In another aspect, along with increase of users of a mobile terminal and improvement of the data processing ability of the mobile terminal, an increasingly higher data download speed is needed for the mobile terminal. Although p2sp multi-source download technologies have achieved great success in network downloading, and can effectively speed up file download and transmission, but still cannot meet the demand for the download speed of the mobile terminal.

Embodiments of the present disclosure provide a network acceleration method based on a router device, where a data access request sent by a user terminal is received, and a download link included in the data access request is obtained; whether a download file corresponding to the download link is pre-cached is determined; and if the download file corresponding to the download link is pre-cached, the corresponding download file is sent to the user terminal.

A router determines whether the file corresponding to the link in the data access request is a download file pre-cached by the router, and if the file corresponding to the link in the data access request is the pre-cached download file, the cache file in the router is directly sent to the user terminal for downloading. Therefore, the user terminal can obtain more rapidly a file that needs to be downloaded on the premise of not increasing hardware costs, and utilization efficiency of network resources is improved.

Embodiment 1

Figure 1:
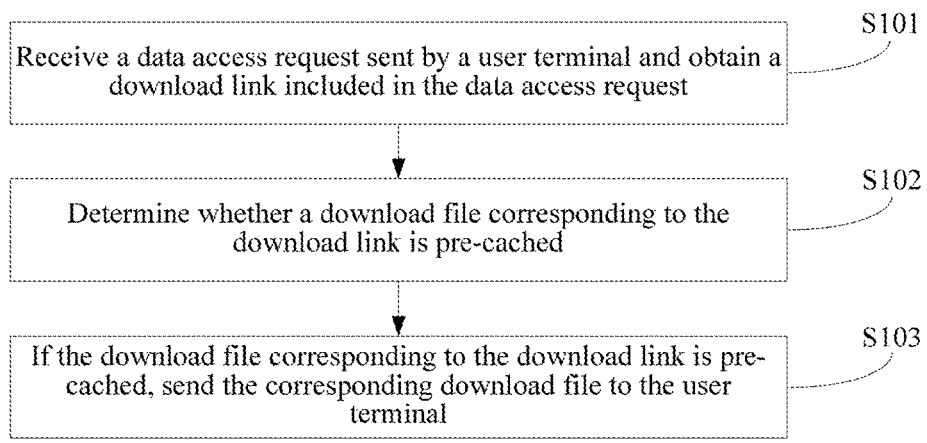
FIG. 1 is an implementation flowchart of a network acceleration method based on a router device according to a first embodiment of the present disclosure.

FIG. 1 shows an implementation process of a network acceleration method based on a router device according to a first embodiment of the present disclosure, which is described in detail as follows:

In step S101: receive a data access request sent by a user terminal and obtain a download link included in the data access request.

Specifically, the user terminal in this embodiment of the present disclosure may include a smartphone, a tablet computer, a notebook computer, a desktop computer, and so on.

The received data access request that is sent by the user terminal in this embodiment of the present disclosure may be an access request sent by means of a wired network by a user by using a desktop computer or a notebook computer, and may also be an access request sent by means of a wireless communications network, such as WiFi of a wireless router, by a smartphone, a tablet computer, a notebook computer, or a desktop computer. In addition, the access request may be the directly received access request that is sent by the user terminal, and may also be an access request forwarded by a cascading router or switch device.

The data access request sent by the user may be, but is not limited to: a triggered URL (Uniform Resource Locator) link of an http (Hypertext transfer protocol) download session, or an ed2k (that is, eDonkey2000 network, which is a file-sharing network) link, or a triggered download link of a torrent file of a Bt (that is, BitTorrent, which is a file distribution protocol, and a file-sharing network protocol program used in a peer-to-peer network. Different from a point-to-point protocol program, the file-sharing network protocol program is peer-to-peer, and if there are more users, and more people download a same file, which continues to maintain an upload state after being downloaded to become a seed file (torrent) of its client node for downloading, the file is downloaded at a faster speed) seed. The torrent file is essentially a text file, including two parts: Tracker (Path) information and file information. The Tracker information is mainly an address of a Tracker server that needs to be used in BT downloading, and settings for the Tracker server. The file information is generated according to computation of a target file, and a computation result is encoded according to a B encoding rule in the BitTorrent protocol. Therefore, the torrent file is an "index" for a downloaded file.

The router in this embodiment of the present disclosure is a device that connects local area networks and wide area networks in the Internet, and the router is a device that automatically selects and sets a route according to a channel condition, and sends signals by means of a best path and according to a sequence. A router is a hub and a "traffic police officer" of an interconnection network. At present, the router is widely applied to various industries, and various products of different grades have become main forces for implementing services of internal connection between various backbone networks, interconnection between backbone networks and interworking between backbone networks and the Internet. In addition, closest related to the present disclosure, current routers themselves each have an independent embedded operating system, an independent CPU and memory, and may be regarded as a specialized computer system.

In step S102: determine whether a download file corresponding to the download link is pre-cached.

Specifically, the determining may be completed by searching for data in an index database established in advance. The index database stores a check value of the download file corresponding to the received download link. The check value is compared with a check value of a pre-cached file to obtain whether a file that needs to be downloaded is included.

The index database may be set in a router device, and an independent index data server may also be set. Index data of all routes can be updated accordingly by changing data in the index data server.

Check may be HASH check, MD5 check, or SHA digest message check.

The HASH check refers to that an input of an arbitrary length is transformed into an output of a fixed length by using a hash algorithm, and the output is a hash value. This transformation is a type of compression mapping, where a space of a hash value is usually much smaller than a space of an input, and different inputs may be hashed into a same output, so an input value cannot be uniquely determined from a hash value. In short, the HASH check is a function that compresses a message of an arbitrary length to a message digest of a certain fixed length.

The MD5 check refers to that a hash operation is performed on received transmission data to check accuracy of the data. A calculated hash value is compared with a hash value that is transmitted along with the data. If the two values are the same, it indicates that the transmitted data is complete and correct, and has not been tampered.

The SHA is a type of data encryption algorithm. A principle of the algorithm is receiving a plain text, and then converting the plain text into a cipher text (usually smaller) in an irreversible manner, which may also be simply understood as a process of taking a string of input code (referred to as pre-mapping or information) and converting the input code into an output sequence of a small length and a fixed number of digits, that is, a hash value (also referred to as information digest or information authentication code).

In step S103: if the download file corresponding to the download link. is pre-cached, send the corresponding download file to the user terminal.

If the download file corresponding to the download link is cached, that is, when a check value of a found file is the same as a check value corresponding to the download link by using the check in step S102, it indicates that the download file is cached in settings of a current router, and file download is provided directly by the cache file of the current router.

As a better implementation manner of this embodiment of the present disclosure, a location of a corresponding resource node of the download file corresponding to the download link is also included in the index database, for example, a multi-source link and an address of a computer that are corresponding to the download file, so that the user terminal can start P2SP multi-source download according to the multi-source link and the address of the computer, and download or cache a needed file rapidly.

Because an existing router generally has a large bandwidth, and the speed magnitude of data transmission between the router itself and a user terminal does not affect bandwidth occupation of other networks, this embodiment of the present disclosure can effectively improve a network download speed while ensuring network stability well without increasing hardware costs.

Embodiment 2

Figure 2:
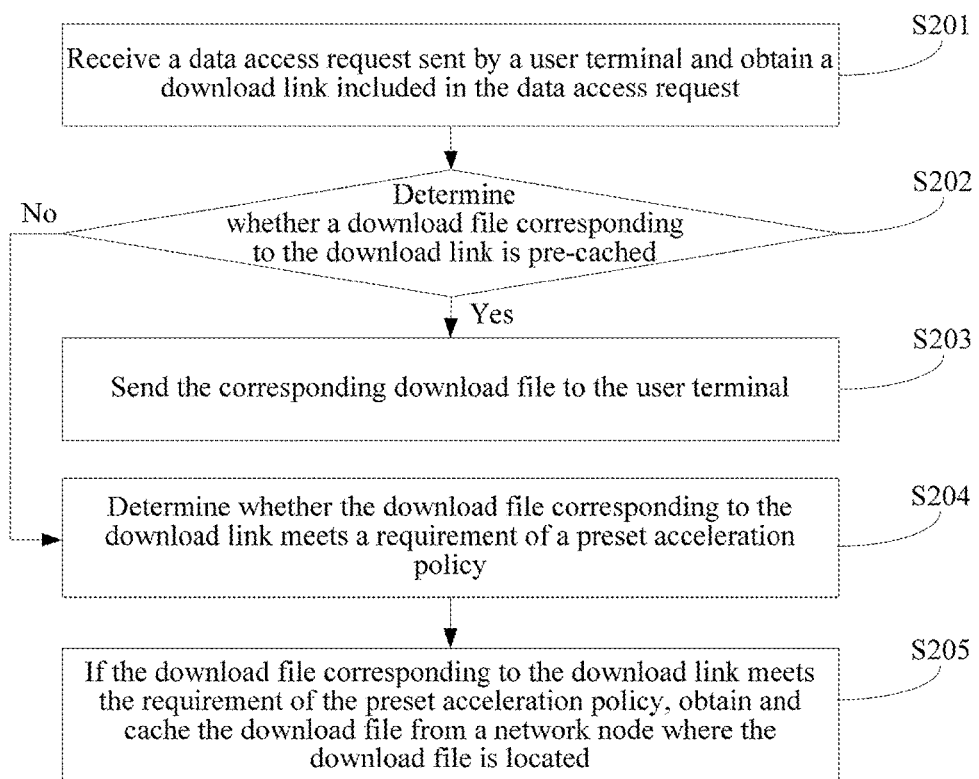
FIG. 2 is an implementation flowchart of a network acceleration method based on a router device according to a second embodiment of the present disclosure.

FIG. 2 shows an implementation process of a network acceleration method based on a router device according to a second embodiment of the present disclosure, which is described in detail as follows:

In step S201: receive a data access request sent by a user terminal and Obtain a download link included in the data access request.

In step S202: determine whether a download file corresponding to the download link is pre-cached.

In step S203: if the download file corresponding to the download link is pre-cached, send the corresponding download file to the user terminal.

Step S201 to step S203 are the same as step S101 to step S103 in Embodiment 1, which are not described herein again.

In step S204: if the download file corresponding to the download link is not pre-cached, determine whether the download file corresponding to the download link meets a requirement of a preset acceleration policy.

Before this step, the method may further include receiving a file used for configuring or updating the acceleration policy and sent by a policy configuration server.

The requirement of the acceleration policy in this embodiment of the present disclosure may include that some download protocols need to be filtered, for example, http, emule, Bt, and magnet protocols are filtered; or suffixes of file names of some types of http requests are filtered; or file requests of some size ranges are filtered, or access to some game application servers is accelerated. Names of these game application servers and primary IP addresses for accessing the game application servers are usually provided.

In step S205: if the download tile corresponding to the download link meets the requirement of the preset acceleration policy, obtain and cache the download file from a network node where the download file is located.

If the download file corresponding to the download link does not meet the requirement of the preset acceleration policy, a location of a corresponding resource node of the download file corresponding to the download link is also included in an index database, for example, a multi-source link and an address of a computer that are corresponding to the download file, so that the user terminal can start P2SP multi-source download according to the multi-source link and the address of the computer, and download or cache a needed file rapidly.

If the download file corresponding to the download link does not meet the requirement of the preset acceleration policy, data access is performed by means of an ordinary network directly.

Compared with Embodiment 1, this embodiment of the present disclosure further includes that the cached file is determined and filtered, data that meets a specific acceleration requirement is cached, and a requirement of an acceleration policy is configured, so that a file that needs to be cached and accelerated can be changed flexibly, thereby further improving a network speed pertinently.

Embodiment 3

Figure 3:
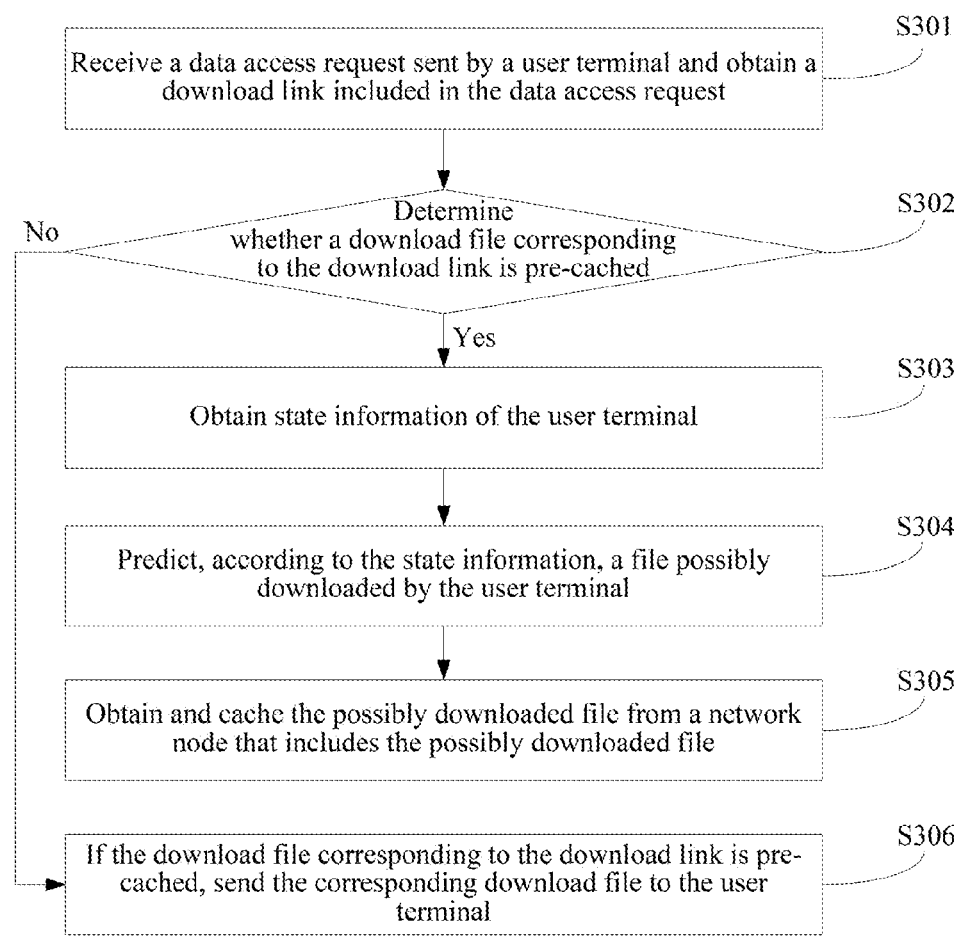
FIG. 3 is an implementation flowchart of a network acceleration method based on a router device according to a third embodiment of the present disclosure.

FIG. 3 shows an implementation process of a network acceleration method based on a router device according to a third embodiment of the present disclosure, which is described in detail as follows:

In step S301: receive a data access request sent by a user terminal and obtain a download link included in the data access request.

In step S302: determine whether a download file corresponding to the download link is pre-cached.

Step S301 to step S302 are the same as step S101 to step S102 in Embodiment 1, which are not described herein again.

In step S303: obtain state information of the user terminal.

The state information of the user terminal includes, but is not limited to, update information of system patch files of the user terminal, version update information of an application program in a system of the user terminal, and video playback state information of the user terminal.

Preferably further, the version update information of an application program in a system of the user terminal is version update information corresponding to an application program of which use frequency reaches a certain threshold in the system of the user terminal, for example, a user terminal that frequently runs a game application program obtains patch state information of the game application program.

Frequently used file data information of the user terminal may include video playback information. For example, when playing series, the user terminal obtains state information of the series currently played by the user terminal.

In step S304: predict, according to the state information, a file possibly downloaded by the user terminal.

Specifically, it is predicted according to the state information, for example, update information of system patch files that possibly updated and downloaded patch files are some important patch or vulnerability files.

For the version update information of an application program in a system of the user terminal, patch files of version update of a frequently used application program are predicted, or a currently popular application program may also be included.

For the video playback state information of the user terminal, for videos of series, it may be predicted that a possibly downloaded file is video data of a next episode not played yet; for a user video playback state, preferences of a user for video types may also be obtained, and other video data of the preferences may be cached.

In step S305: obtain and cache the possibly downloaded file from a network node that includes the possibly downloaded file.

A location of a corresponding resource node of the download file corresponding to the download link may also be included in the index database, for example, a multi-source link and an address of a computer that are corresponding to the download file, so that the user terminal can start P2SP multi-source download according to the multi-source link and the address of the computer, and download or cache a needed file rapidly.

Preferably, the possibly downloaded file is obtained and cached from the network node that includes the possibly downloaded file within a predetermined time period.

For example, a network idle time period is chosen for caching a data tile. The network idle time period may be a midnight idle time, for example, 12:00-08:00, and the file possibly downloaded by the user terminal is cached actively.

In step S306: if the download file corresponding to the download link is pre-cached, send the corresponding download file to the user terminal.

This step is the same as step S103 in Embodiment 1, which is not described herein again.

Different from Embodiment 1, this embodiment of the present disclosure further includes caching a possibly downloaded file according to a state of a user terminal, pushing a corresponding data file according to a specific user terminal, and performing caching actively, thereby further improving a file obtaining speed of the user terminal and improving file transmission efficiency.

Embodiment 4

Figure 4:
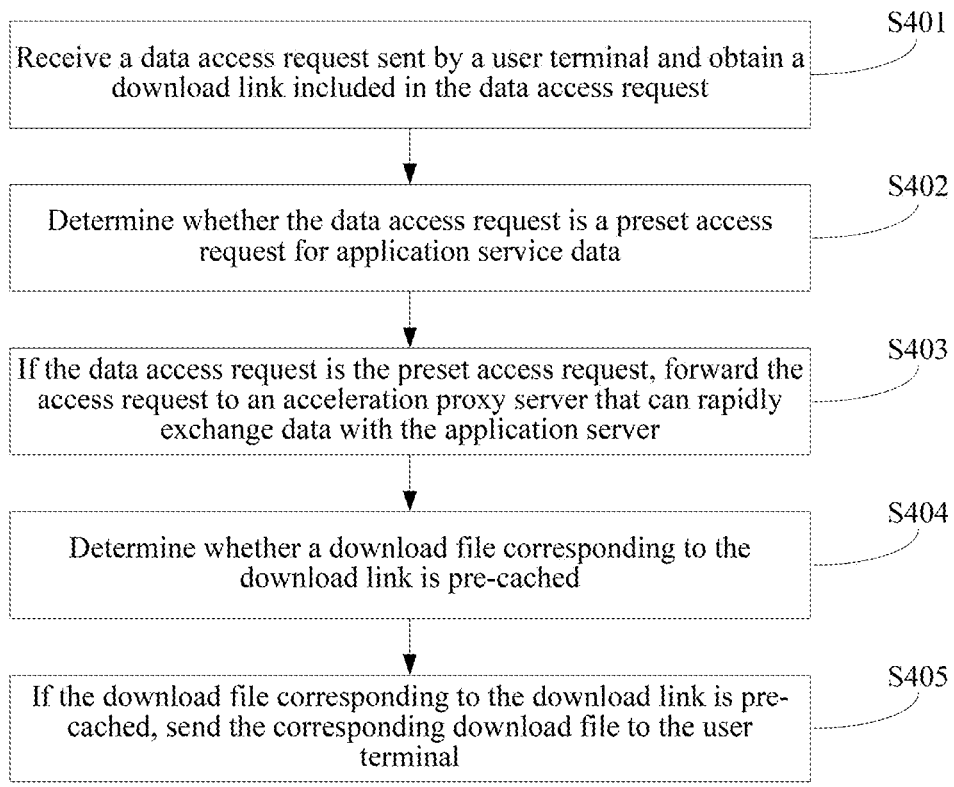
FIG. 4 is an implementation flowchart of a network acceleration method based on a router device according to a fourth embodiment of the present disclosure.

FIG. 4 shows an implementation process of a network acceleration method based on a router device according a fourth embodiment of the present disclosure, which is described in detail as follows:

In step S401: receive a data access request sent by a user terminal and obtain a download link included in the data access request.

In step S402: determine whether the data access request is a preset access request for application service data.

Specifically, a high priority may be needed to ensure stability of some application programs run by the user terminal; therefore, this step may be used for determining the data access request, and a determining method may be performing comparison based on a name of an accessed server or an IP address of an accessed server.

In step S403: if the data access request is the preset access request for application service data, forward the access request to an acceleration proxy server that can rapidly exchange data with the application server.

If the data access request is the preset access request for application service data, P2SP is invoked to perform multi-source download on a file, or an acceleration proxy server is invoked to implement the specific acceleration proxy service, and rapid data exchange is implemented between the user terminal and a server by using the acceleration proxy server.

The acceleration proxy server, which has good connectivity to both the user terminal and a server of a specific service, is usually a server accessed by a user nearby or an access server of operation, and can maintain an adjustable network path with an acceleration proxy server at a next level. By using the acceleration proxy server, a data packet related to an application service of the user terminal is fully forwarded to an application acceleration proxy server at a next level. A ping delay is usually used as a basis for measuring an effect of connectivity with the acceleration proxy server at a next level, and an acceleration proxy server at a next level having a minimum delay is selected. If a first-level acceleration proxy server itself has a good effect of direct connectivity with an application service server, a next level, that is, a second-level acceleration proxy server may also be skipped.

In step S404: determine whether a download file corresponding to the download link is pre-cached.

In step S405: if the download file corresponding to the download link is pre-cached, send the corresponding download file to the user terminal.

In this embodiment of the present disclosure, a preset access request for application service data is determined, and an acceleration proxy server is used accordingly, so that data exchange between a user terminal and an application server can be completed rapidly and effectively, and stability and reliability of service data can be better ensured.

Embodiment 5

Figure 5:
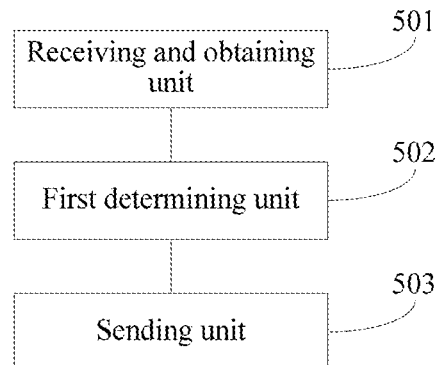
FIG. 5 is a schematic structural diagram of a network acceleration apparatus based on a router device according to a fifth embodiment of the present disclosure.

FIG. 5 is a structural block diagram of a network acceleration apparatus based on a router device according to a fifth embodiment of the present disclosure, which is described in detail as follows:

The network acceleration apparatus based on a router device in this embodiment of the present disclosure includes:

a receiving and obtaining unit 501, configured to receive a data access request sent by a user terminal and obtain a download link included in the data access request;

a first determining unit 502, configured to determine whether a download file corresponding to the download link is pre-cached; and a sending unit 503, configured to: if the download file corresponding to the download link is pre-cached, send the corresponding download file to the user terminal.

Further, the apparatus further includes:

a second determining unit, configured to: if the download file corresponding to the download link is not pre-cached, determine whether the download file corresponding to the download link meets a requirement of a preset acceleration policy; and a first obtaining and caching unit, configured to: if the download file corresponding to the download link meets the requirement of the preset acceleration policy, obtain and cache the download file from a network node where the download file is located.

Further, the apparatus further includes:

a state information obtaining unit, configured to obtain state information of the user terminal;

a predicting unit, configured to predict, according to the state information, a file possibly downloaded by the user terminal; and a second obtaining and caching unit, configured to obtain and cache the possibly downloaded file from a network node that includes the possibly downloaded file.

Further, the apparatus further includes:

an access request determining unit, configured to determine whether the data access request is a preset access request for application service data; and a forwarding unit, configured to: if the data access request is the preset access request for application service data, forward the access request to an acceleration proxy server that can rapidly exchange data with the application server.

The network acceleration apparatus based on a router device in this embodiment of the present disclosure corresponds to the network acceleration methods based on a router device in Embodiment 1 to Embodiment 4, which are not described herein again.

Embodiment 6

Figure 6:
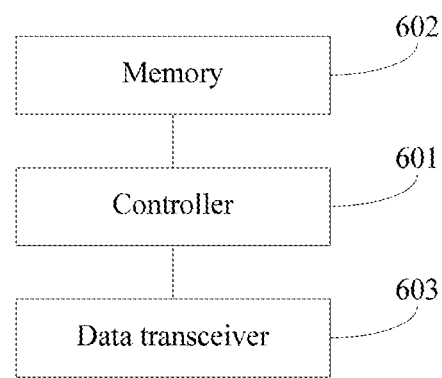
FIG. 6 is a schematic structural diagram of a network node device according to a sixth embodiment of the present disclosure.

FIG. 6 is a schematic structural diagram of a network node device according to a sixth embodiment of the present disclosure, which is described in detail as follows:

The network node device in this embodiment of the present disclosure includes a controller 601, a memory 602, and a data transceiver 603.

The data transceiver 603 is configured to receive a data access request of a user terminal, the controller 601 obtains a download link included in the data access request and determines whether a download file corresponding to the download link is pre-cached in the memory 602, and if the download file corresponding to the download link is pre-cached in the memory 602, the data transceiver 603 sends the corresponding download file to the user terminal.

Further, the controller 601 is further configured to: if the download file corresponding to the download link is not pre-cached by the memory 602, determine whether the download file corresponding to the download link meets a requirement of a preset acceleration policy, and if the download file corresponding to the download link meets the requirement of the preset acceleration policy, obtain and cache, by means of the data transceiver 603, the download file from a network node where the download file is located.

Further, the data transceiver 603 is further configured to obtain state information of the user terminal, and the controller 601 is configured to predict, according to the state information, a file possibly downloaded by the user terminal, and obtain, by means of the data transceiver 603, the possibly downloaded file from a network. node that includes the possibly downloaded file and cache the possibly downloaded file in the memory 602.

Further, the controller 601 is further configured to: determine whether the data access request is a preset access request for application service data, and if the data access request is the preset access request for application service data, forward the access request to an acceleration proxy server that can rapidly exchange data with the application server.

Preferably, the network node device in this embodiment of the present disclosure is a wireless router.

The network node device in this embodiment of the present disclosure corresponds to the methods in Embodiment 1 to Embodiment 4.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A network acceleration method based on a router device, comprising:
   receiving a data access request sent by a user terminal and obtaining by the router device, a download link comprised in the data access request;
   determining by the router device, whether a download file corresponding to the download link is pre-cached in the router device;
   obtaining by the router device, state information of the user terminal;
   predicting, according to the state information, a file possibly downloaded by the user terminal:
   obtaining by the router device, and caching the possibly downloaded file from a network node that comprises the possibly downloaded file, wherein the network node is different from the router device; and
   if the download file corresponding to the download link is pre-cached in the router device, sending by the router device, the corresponding download file to the user terminal.

2. The method according to claim 1, wherein, after the step of determining whether a download file corresponding to the download link is pre-cached in the router device, the method further comprises:
   if the download file corresponding to the download link is not pre-cached in the router device, determining whether the download file corresponding to the download link meets a requirement of a preset acceleration policy; and
   if the download file corresponding to the download link meets the requirement of the preset acceleration policy in the router device, obtaining and caching by the router device, the download file from a network node where the download file is located.

3. The method according to claim 2, wherein, before the step of if the download file corresponding to the download link is not pre-cached in the router device, determining whether the download file corresponding to the download link meets a requirement of a preset acceleration policy in the router device, the method further comprises:
   receiving a file used for configuring or updating the acceleration policy and sent by a policy configuration server.

4. The method according to claim 1, wherein the obtaining and caching the possibly downloaded file from a network node that comprises the possibly downloaded file specifically is:
   obtaining and caching by the router device, the possibly downloaded file from the network node that comprises the possibly downloaded file within a predetermined time period.

5. The method according to claim 1, wherein, the possibly downloaded file comprises an application program of the user terminal, an update file of a system, or a video file possibly played by the user terminal.

6. The method according to claim 1, wherein, after the step of receiving a data access request sent by a user terminal and obtaining a download link comprised in the data access request, the method further comprises:
   determining by the router device, whether the data access request is a preset access request for application service data; and
   if the data access request is the preset access request for application service data, forwarding by the router device, the access request to an acceleration proxy server that can rapidly exchange data with an application server.

7. A network acceleration apparatus based on a router device, comprising:
   a data transceiver configured to receive a data access request sent by a user terminal and to obtain a download link comprised in the data access request;
   a program code stored in a memory, when executed by a controller, configured to determine whether a download file corresponding to the download link is pre-cached;
   the program code when executed by the controller, further configured to:
      obtain state information of the user terminal;
      predict, according to the state information, a file possibly downloaded by the user terminal; and
      obtain and cache the possibly downloaded file from a network node that comprises the possibly downloaded file; and the data transceiver further configured to, if the download file corresponding to the download link is pre-cached, send the corresponding download file to the user terminal.

8. The apparatus according to claim 7, wherein the program code is further configured to, when executed by the controller:
   if the download file corresponding to the download link is not pre-cached, determine whether the download file corresponding to the download link meets a requirement of a preset acceleration policy; and
   if the download file corresponding to the download link meets the requirement of the preset acceleration policy, obtain and cache the download file from a network node where the download file is located.

9. The apparatus according to claim 7, wherein the program code is further configured to, when executed by the controller:
   determine whether the data access request is a preset access request for application service data; and
   if the data access request is the preset access request for application service data, forward the access request to an acceleration proxy server that can rapidly exchange data with an application server.

10. A network node device, comprising:
    a controller, a memory, and a data transceiver;
    wherein the data transceiver is configured to receive a data access request of a user terminal, and to obtain state information of the user terminal;
    wherein the controller is configured to:
       obtain a download link comprised in the data access request and determine whether a download file corresponding to the download link is pre-cached in the memory, and if the download file corresponding to the download link is pre-cached in the memory, the data transceiver is configured to send the corresponding download file to the user terminal; and
    predict, according to the state information, a file possibly downloaded by the user terminal, and obtain the possibly downloaded file from a network node that comprises the possibly downloaded file by means of the data transceiver and cache the possibly downloaded file in the memory.

11. The device according to claim 10, wherein, the controller is further configured to:
    if the download file corresponding to the download link is not pre-cached by the memory, determine whether the download file corresponding to the download link meets a requirement of a preset acceleration policy; and
    if the download file corresponding to the download link meets the requirement of the preset acceleration policy, obtain and cache the download file from a network node where the download file is located.

12. The device according to claim 10, wherein, the controller is further configured to:
    determine whether the data access request is a preset access request for application service data; and
    if the data access request is the preset access request for application service data, forward the access request to an acceleration proxy server that can rapidly exchange data with an application server.

* * * * *